United States Patent [19]

Hee

[11] Patent Number: 4,938,981

[45] Date of Patent: Jul. 3, 1990

[54] EGG ROLL LEAF

[76] Inventor: Dickson L. Hee, 22 Sunset Rd. West, Searingtown, N.Y. 11507

[21] Appl. No.: 430,971

[22] Filed: Nov. 1, 1989

Related U.S. Application Data

[63] Continuation of Ser. No. 186,361, Apr. 25, 1988, abandoned.

[51] Int. Cl.⁵ ............................................. A21D 13/00
[52] U.S. Cl. ..................................... 426/556; 426/92; 426/94; 426/138; 426/502; 426/503; 426/560
[58] Field of Search ................... 426/92, 94, 138, 283, 426/502, 503, 556, 560, 549

[56] References Cited

U.S. PATENT DOCUMENTS

| | | | |
|---|---|---|---|
| 3,669,007 | 6/1972 | Pulici | 426/94 |
| 4,073,953 | 2/1978 | Trostmann et al. | 426/502 |
| 4,084,493 | 4/1978 | Quintana | 426/94 |
| 4,447,457 | 5/1984 | Bernal | 426/138 |
| 4,457,225 | 7/1984 | Bakker | 426/502 |
| 4,735,811 | 4/1988 | Skarra et al. | 426/138 |
| 4,753,813 | 6/1988 | Saadia | 426/138 |

Primary Examiner—Donald E. Czaja
Assistant Examiner—Mary S. Mims
Attorney, Agent, or Firm—Abelman Frayne Rezac & Schwab

[57] ABSTRACT

A wrapping leaf for use in the automated assembly of egg rolls, or for wrapping other comestible formed into an elongate cylindrical mass, is elliptical in planform and its minor axis is of a length not more than twice the axial length of the cylindrical mass plus twice the diameter thereof, the major axis of the ellipse being appreciably longer than said minor axis.

6 Claims, 9 Drawing Sheets

EGG ROLL LEAF

This application is a continuation of application Ser. No. 186,361, filed Apr. 25, 1988, now abandoned.

FIELD OF THE INVENTION

This invention relates to a pastry leaf to be employed in the production of egg rolls or similar articles in which a prepared filling is enveloped by the pastry leaf and is rolled to provide a substantially cylindrical comestible product. A particular requirement is that the filling preparation be entirely enveloped by the pastry leaf in order to eliminate the ingress of a processing fluid such as boiling oil into the filling preparation during the subsequent frying of the assembled product. While the leaf of the present invention is of great advantage in the hand-assembly of egg rolls and the like, its particular advantage is in the assembly of egg rolls and the like by automated machinery.

BACKGROUND OF THE INVENTION

For convenience, the following discussion of the present invention makes reference to egg rolls as comprising a typical comestible product assembled from the pastry leaves of the present invention. It will, however, be appreciated that any alternative pastry wrapped comestible products of generally cylindrical form are also contemplated, such as completely wrapped sausages, particularly cocktail sausages, fruit conserves, cheeses and the like which have been assembled into a generally cylindrical form approximating that of the filling of an egg roll.

Egg rolls are well know in the art and have been known for many years

An egg roll is comprised of a generally cylindrical mass of a filling preparation, usually vegetable materials with the addition of fish, seafood, meat or cheese, and which has been suitably flavored by the addition of salt, flavor enhancers, spices and the like.

In the assembled form of the egg roll, the cylindrical mass of filling preparation is wrapped completely within a single leaf of an appropriately aged pastry material formed form a admixture of flour, water, salt, and if desired, egg white or whole egg.

In the formation of the leaves the admixed mass is extruded into ribbon-like form before aging of that material and is then passed through calendering rolls to produce a continuous sheet of pastry material, commonly of 24 inches width. Due to the manner in which it is formed, the grain of the sheet, i.e., its axis of maximum strength, extends longitudinally of the sheet.

The sheet is then cut into squares, commonly seven inch squares, and the cut sheets are then stacked to permit them to age and the gluten content coalesce in readiness for subsequent use of the leaves in the assembly of egg rolls. A dusting of corn starch is applied during the rolling process to prevent adhesion of the pastry material to the calendering rolls, and also to prevent adhesion between the cut sheets when stacked one upon the other.

Egg rolls of high quality must of necessity be assembled manually if lightness and delicacy of the pastry wrapping is to be preserved. Egg rolls can be produced by automated machinery capable of duplicating the various manual manipulations of a skilled manual assembler, but, only in the event that thicker and thus less delicate pastry leaves are employed.

Typically, a single leaf of the pastry material is placed on a flat surface with the grain of the leaf extending at 45 degrees to the direction of subsequent rolling of the egg roll. So doing orients one pair of opposed corners of the leaf in a longitudinal direction, and orients the other pair of opposed corners in a lateral direction.

A cylindrical mass of a prepared filling preparation is then placed on the pastry leaf with the axis of the cylindrical mass extending parallel to a line extending between the respective lateral corners. The adjacent longitudinal corner of the leaf is then folded over the filling preparation to envelop the axial cylindrical surface of the filling preparation, subsequent to which the lateral corners of the sheet are folded upwardly and over the partially formed egg roll to form end enclosures for the filling preparation.

It is at this point that a problem occurs in the assembly of an egg roll, and, one which presents major problems in the automated assembly of egg rolls. This is due to the fact that the lateral corners of the pastry leaf must be moved from their initial planar condition and conformed to a substantially that of a closed ended cylinder without rupturing or tearing of the leaf.

Rupturing or tearing of the leaf can have disastrous consequences during subsequent processing of the egg roll. Rupturers or tears, or, corners that are not completely closed, can permit the oil in which the assembled egg roll is subsequently fried to enter into the assembled egg roll and come into direct contact with the enveloped filling preparation. The oil typically is at a temperature of 450 degrees or higher. If it is allowed to contact the enveloped filling preparation, the hot oil will cause boiling of the moisture content of the filling preparation and the build-up of steam pressure within the egg roll. At the very best, contamination of the filling preparation with the frying oil will occur. The usual consequence is, however, that a sufficient build-up of steam pressure occurs within the egg roll to cause the explosion of the egg roll while within the mass of boiling oil. Such an occurrence is dangerous and highly undesirable. Not only can it cause spattering of the boiling oil, but also, it will cause contamination of the boiling oil with particles of the filling preparation. Ultimately, those particles become charred in the boiling oil and are deposited and form unpleasant discolorations on the other egg rolls in the batch being processed.

The formation of the first fold in the leaf for it to wrap around the axial cylindrical surface of the filling preparation poses no particular problem whether it be effected manually, or, effected by automated machinery. The reason is that a development of the cylindrical surface of the filling preparation results in a planar form. Thus, one shape is compatible with the other.

The problem arises when the subsequent side folds are to be made. Here, the dichotomy is that a planar sheet is being required to cover an end of a solid cylinder and also to conform to the axial cylindrical surface of that cylinder while producing a minimum of stresses in the leaf, and at the same time minimizing folds and unsightly bulges in the folded leaf. The problem is somewhat similar to that of inserting a cylindrical object into a conventional mailing envelope and then requiring the conventional mailing envelope to conform to the external cylindrical contour of the cylinder. The two shapes are incompatible by virtue of the differences in their geometry.

One alternative that suggests itself in overcoming this problem is to orient the cylinder of filling preparation with its axis parallel to a major edge of the wrapping leaf. This, however, would require pinching of the sheer at the ends of the cylinder of filling preparation subsequent to rolling of the leaf and would result in a product having a shape totally dissimilar to that of a conventional egg roll. Various other alternatives suggests themselves such as those employed in the formation of ravioli packets and the like. However, in each instance the resulting product would not have the appearance of a conventional egg roll.

The problem that arises in the formation of egg rolls, is that the geometry is such that the side folds do not automatically assume a position in which they extend perpendicular to the longitudinal axis of the filling preparations. Instead, the side folds will assume position during rolling of the egg roll in which they diverge one from the other relative to the axis of the filling preparation, i.e., they will splay outwardly. Unless this condition is corrected prior to rolling of the egg roll, it will result in overhangs and an unsightly appearance at the ends of the egg roll.

The reasons for this outward splaying lie in the geometry of the thusly folded leaf. An axis or longitudinal cross section through the filling preparation approximates a rectangle, and the leaf at this point has been folded into the shape of a hollow rectangular cylinder. If, now, the hollow rectangular cylinder is collapsed to planar form, as it will be in the subsequent rolling of the egg roll, then, the sides of the hollow rectangular cylinder will move outwardly by one half of the height of those sides.

An astute manual assembler can correct this problem during the hand-assembly of the egg roll by a re-orienting process of pinching the tucking-in of the leaf at the ends of the filling preparation, and by pulling back the folds between the longitudinal side folds and the lateral first fold. This, however, is a highly skilled operation that depends on the acuity and manual dexterity of the assembler, and is dominantly a matter of "feel" on the part of the assembler. These variables cannot be predicted with accuracy, and as a consequence, automated machinery has not been developed for duplicating the manual operations.

Heretofore, the assembly of egg rolls by automated machinery has only been accomplished by compromising the neatness and aesthetic appearance of the machine formed egg roll by purposely permitting the formation of unattractive overhangs at the ends of the egg roll. Additionally, the machine forming operation compromises the delectability of the formed egg roll by the need to employ relatively coarse leaves of a sufficient weight and strength to accommodate the increased stresses arising in the automated assembly process.

Typically, a skilled manual assembler of egg rolls working with a standard seven inch square leaf can produce a defect-free egg roll from leaves weighing as little as 16 leaves to the pound weight. In contradistinction, it is found that leaves weighing as much as 8–10 leaves to the pound weight must be used in an automated process in order to produce defect free egg rolls. This, however, results in a cardboardlike covering of machine assembled egg roll as opposed to a delectable, crisp and readily frangible covering produced by a skilled manual assembler. For this reason, machine assembled "frozen" egg rolls produced by automated machinery have met with less than favorable consumer acceptance in view of the tough, doughy and heavy texture of the covering leaf.

SUMMARY OF THE INVENTION

It is an object of this invention to provide an egg roll leaf or the like that not only will be more readily assemblable into an egg roll by a skilled manual assembler with a reduction in the number of rejects in the rolled product, but, which also will permit the automated assembly of an egg roll of increased consumer acceptance using leaves of far less weight than those at present mandated in an automated process.

Typically, the present invention contemplates the use of leaves having a weight of 14 to 18 leaves to the pound weight and which are assemblable by automated machinery into an egg roll of closely comparable quality to that of a hand assembled egg roll, i.e., leaves of exactly the same processed pastry material are employed, but which have a thickness of only approximately two-thirds of leaves presently employed in an automated process, and, which in addition to being of reduced thickness are also of reduced surface area, this resulting in a more delectable finished product.

According to the present invention, the leaves of the present invention are other than square, and instead are oval or elliptical in plan form, or are in the form of an irregular hexagon, the lateral dimension of the leaf falling in the range of (1.5L plus 2D) to (2L plus 2D) where L is the axial length of the cylinder of filling preparation and D is the diameter of the cylinder of filling preparation.

As will be evidenced from the following discussion, this results in the substantial elimination of the lateral corners of a standard egg roll leaf and a reduction in the mass of the covering of the egg roll, and also results in the elimination of overhangs at the ends of the egg roll while at the same time permitting the leaf to be made of lesser thickness and than that of leaves employed in the assembly of an egg roll by an automated process.

BRIEF DESCRIPTION OF THE DRAWINGS

The invention will now be described with reference to the accompanying drawings which illustrate a preferred embodiment thereof, and in which:

FIGS. 4 through 11, each of which are identified as prior art illustrate the various steps in the wrapping of a cylindrical mass of a filling preparation in the manufacture of an egg roll, and are included in order to illustrate the problem overcome by the present invention;

DESCRIPTION OF THE PREFERRED EMBODIMENTS

Figure 1:
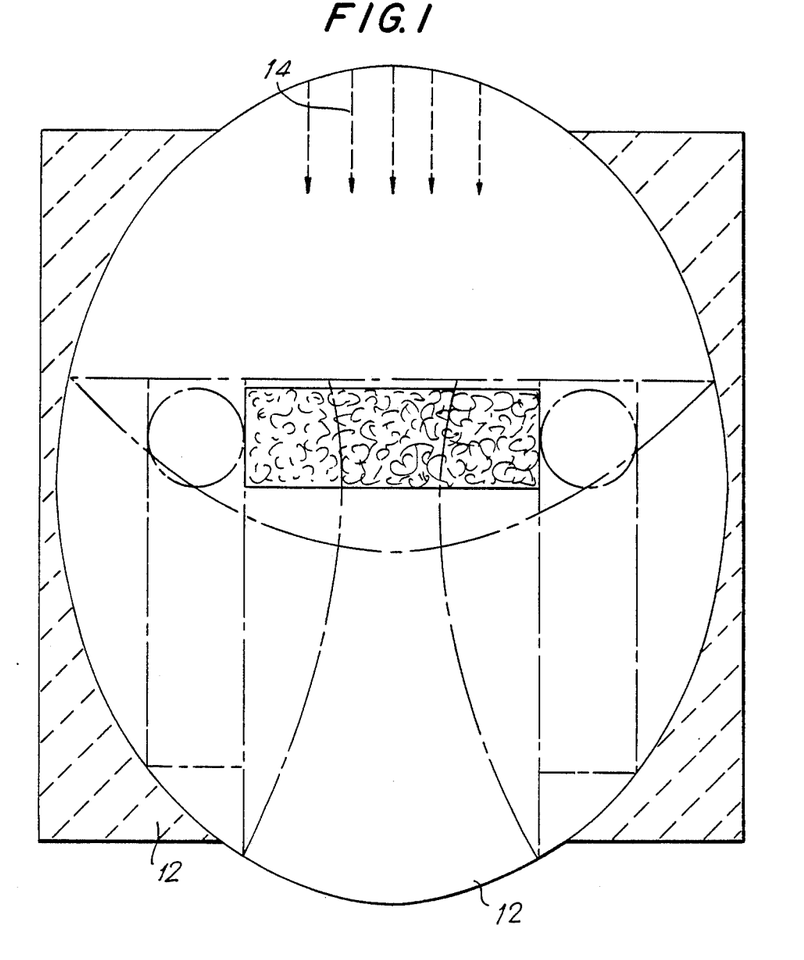
FIG. 1 is a diagrammatic illustration of one configuration of egg roll leaf according to the present invention shown in superposed relation with a conventional egg roll leaf as conventionally employed in the art in the hand assembly or automated assembly of an egg roll.

Referring the FIG. 1, the egg roll leaf of the present invention is indicated at 12. The egg roll leaf is a formed from conventional materials and in an entirely conventional manner to known egg roll leaves, but, differs from conventional egg roll leaves in two major respects.

The first of those respects is in the shape of the egg roll leaf, which, as will be seen, is elliptical in planform, the major axis of the ellipse lying in the direction of the grain of the sheet of pastry material from which the egg roll leaf has been cut.

Typically, the egg roll leaf 12 will have a dimension along its major axis of 8.25 inches, and, a dimension along its minor axis of 6.50 inches, the direction of the grain being illustrated diagrammatically at 14.

While a truly elliptical shape of egg roll leaf has been illustrated, it will be appreciated that minor variations can be made in the actual shape of the egg roll leaf, provided that the relationship of the major axis to the minor axis is maintained. For example, instead of being defined by a continuous curve, the periphery of the leaf could be defined by tangents to that curve, i.e., be in the form of a plurality of straight edges arranged at angles to each other and approximating a continuous curve, i.e., be formed in the shape of an irregular polyhedron.

The dimensions of the egg roll leaf of the invention in relation to the dimensions of the cylindrical mass of filling material to be wrapped are within critical limits, particularly in the respect of the dimension in the direction of the minor axis. Clearly, that dimension must satisfy the relation "to the length of the cylindrical mass of the filler material" plus twice the diameter of the mass of filler material in order for the leaf to extend beneath the mass of filler material, and, then up the sides thereof. Proceeding from this point, the major dissimilarity with prior art egg roll leaves manifests itself. This major difference is that the portions of the egg roll leaf to be folded over the mass of filler material in the final fold each shall be "of a width not more than one-half the axial length of the filling of cylindrical mass of filler material".

For clarity of the illustration, in FIG. 1 the egg roll leaf 12 of the present invention is shown overlying the conventional egg roll leaf 16 according to the prior art. The egg roll leaf 16 of the prior art is rectangular, typically a 7 inch square. The length of the hypoteneuse of a 7 inch square is 10 inches, in contrast to the length of 8.25 inches along the major axis of the egg roll leaf 12 of the present invention. Further, the minor axis of the egg roll leaf 12 of the present invention is subtantially less than the length of the hypoteneuse extending between the side corners of a conventional prior art leaf 16.

While seemingly the area of the egg leaf 12 of the present invention, as illustrated in FIG. 1, appears to be greater than the area of the prior art egg roll leaf 16, this in fact is not so, the area of the egg roll leaf 12 of the present invention being appreciatably less than the area of the conventional egg roll leaf 16 of the prior art, it here being observed of that the egg roll leaf 16 of the prior art would be employed for wrapping a cylindrical mass of filler material identical with the one to be employed with the leaf of the invention.

The second major difference is that the egg roll leaf 12 the present invention can be of a gauge considerably less than the gauge of a conventional prior art egg roll leaf 16 as used in the automated manufacture of egg rolls, the egg roll leaf 12 of the present invention of thus comprising considerably more leaves to the pound weight than those of the prior art leaf 16. Typically, the leaves 12 of the present invention will weigh as little as 16 leaves to the pound weight, whereas, the prior art leaves 16 would of necessity weigh as much as 8-10 leaves to the pound weight.

At this point, it will apparent that there are a multiplicity of differences between the egg roll leaf 12 of the present and the egg leaves 16 of the prior art. Not only is the egg roll leaf 12 of the present invention of different shape to the prior art leaves, but also, the orientation of the grain is differently disposed in the wrapping of the egg roll, the thickness of the leaf 12 of the present invention is considerably less than that of the prior art leaves, and, as will appear, totally different conditions arise during the wrapping and rolling of an egg roll by using the leaf 12 of the present invention which result in the possibility of automation of the formation of egg rolls in a highly satisfactory manner with results closely simulating the appearance and quality of an expertly rolled hand made egg roll.

The reasons for these improvements over the prior art will appear from the following discussion of the procedures in the wrapping of an egg roll employing conventional egg roll leaves such as the prior art leaf 16 of FIG. 1, as contrasted with the wrapping of an egg roll employing the egg roll leaf according to the present invention.

Figure 2:
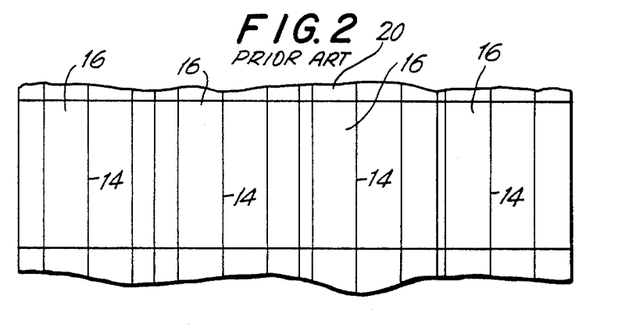
FIG. 2 is a diagrammatic representation of the manner of forming egg roll leaves according to the prior art.
Figure 3:
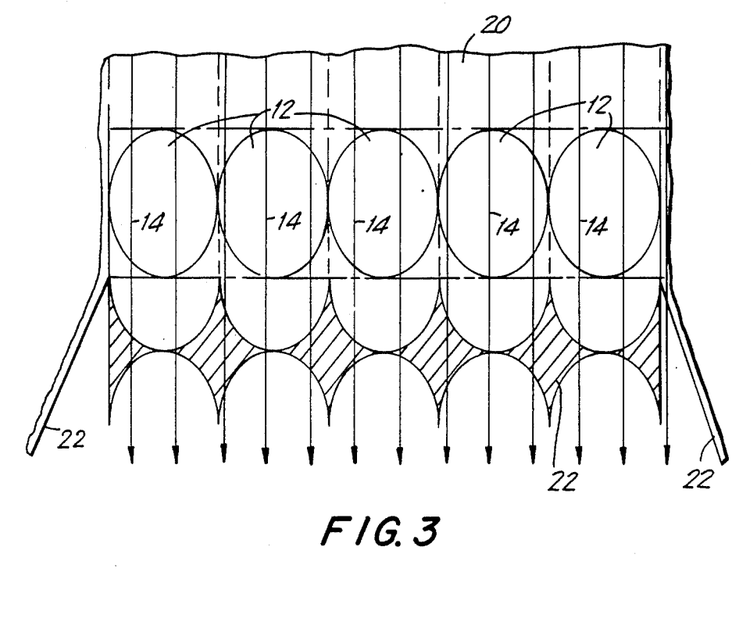
FIG. 3 is a diagrammatic illustration of the manner of forming egg roll leaves according to the present invention.

Referring now to FIGS. 2 and 3, FIG. 2 illustrates the manner of formation of the prior art leaves 16. In FIG. 2, a calendered sheet of pastry material 20 is cut longitudinally and then cut transversely accros the grain 14. However, as will appear, the direction of the grain 14 in the "as cut" condition of the prior art leaves 16 is not the orientation appearing in the wrapping of an egg roll.

Referring now to FIG. 3, the egg roll leaves 12 of the present invention are cut in a elliptical form from a travelling band of pastry material 20, with the grain 14 extending in the direction of the major axis of the leaves 12. Cutting in this manner will result in minor excess material as indicated at 22. However, that material is not in a cured condition, in view of which it can be desiccated and returned to the stock from which the batch of pastry material 22 is being formed. Of importance is that this excess material is eliminated as extra weight and bulk in the finished egg roll, whereas, according to the prior art of teachings, that excess material is incorporated into the finished egg roll with a consequential loss of delicacy in the wrapping of prior art egg rolls, as will now be discussed in reference to FIGS. 4 through 11.

DISCUSSION OF THE PRIOR ART

Figure 4:
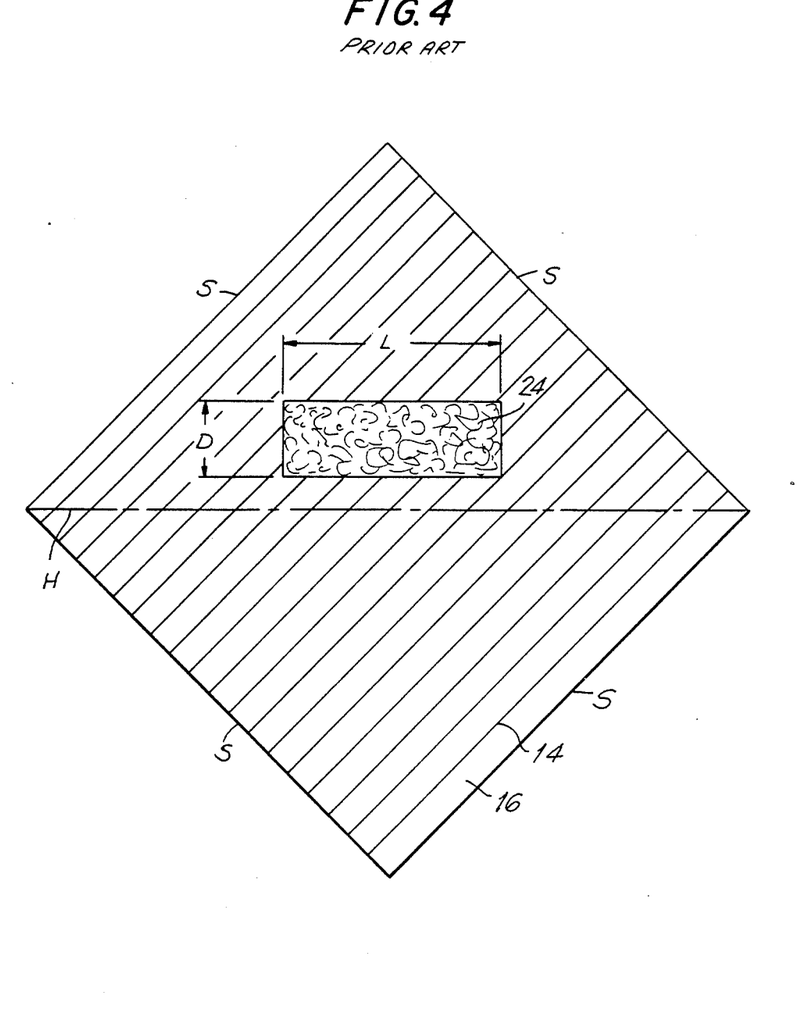
FIG. 4 illustrates the prior art egg roll leaf, and a cylindrical mass of filling preparation prior to the folding of the leaf.

Referring now to FIG. 4, a prior art egg roll leaf 16 is shown in the attitude it will occupy immediately preparatory to the wrapping of a cylindrical mass of filler material 24.

The leaf 16 is placed on a planar surface and is rotated by 45 degrees into a position which its hypoteneuse extends in a lateral direction and substantially parallel to the longitudinal axis of the cylindrical mass of filler material 24. This orients the grain 14 of the prior art leaf 16 at 45 degrees to the direction of the folding, i.e., the grain is oriented at an angle to the major stresses that will arise in the wrapping of the egg roll, thus reducing the ability of the prior art egg roll leaf 16 to resist tears and ruptures arising in the rolling operation.

Figure 5:
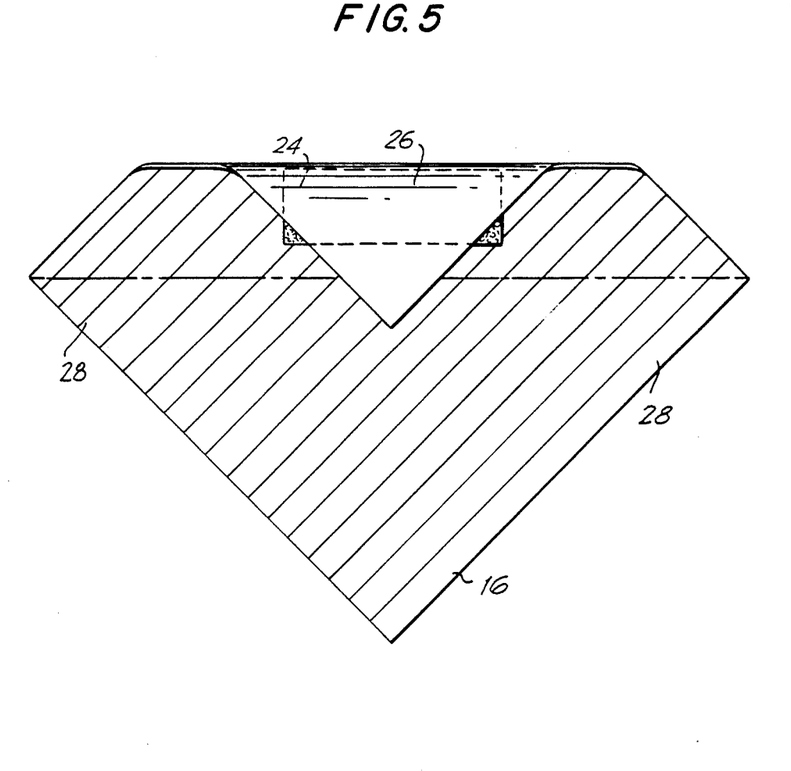
FIG. 5 illustrates the first fold of the prior art egg roll leaf.

Having positioned that the mass 24 of filler material on the prior art leaf 16, the mass of filler material 24 typically being position displaced to one side of the lateral hypoteneuse, a first fold is effected to bring the top corner 26 of the leaf 16 upwardly over the mass of filler material 24, and then downwardly into touching engagement with the top face of the leaf 16. This particular manipulation of the leaf 16 poses no particular problems, in that all that is required is that the flexible planar leaf 16 be conformed at its top corner to the cylindrical surface of the mass of filler material 24, and, the top corner 26 readily can conform to that cylindrical form without any particular danger of tearing or rupturing of the leaf.

The next step in the procedure is to fold the lateral corners upwardly and over the folded top corner 26 to produce the final folds preparatory to rolling of the egg roll. However, it is at this point that the major stresses appear in the leaf 16 and the possibility of tearing or rupturing of the leaf 16 is greatly increased.

Figure 6:
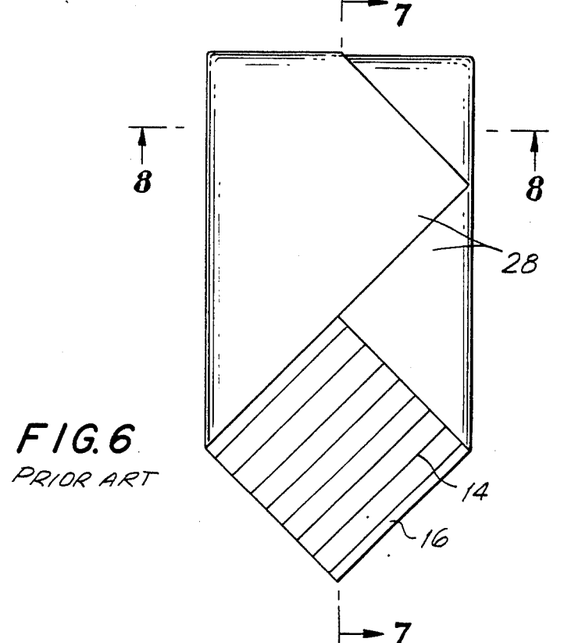
FIG. 6 illustrates the optimum final folds of the prior art egg roll leaf, a condition which is not obtainable according to the prior art.

This final folding of the leaf 16 is illustrated in FIG. 6 in part might be termed an "optimum condition" of folding, and, one that cannot be accomplished other than by the dexterity of a person assembling the egg roll by hand manipulation. Instead, folding of the lateral corners 28 will result in a configuration more closely approximating that illustrated in FIG. 9, i.e., one in which the folded lateral corners 28 collapse outwardly into a generally trapesoidal configuration.

The reasons why this distortion occurs from the optimum final folds of FIG. 6 to the actual final folds of FIG. 9 will now be discussed with reference to FIGS. 7 and 8.

Figure 7:
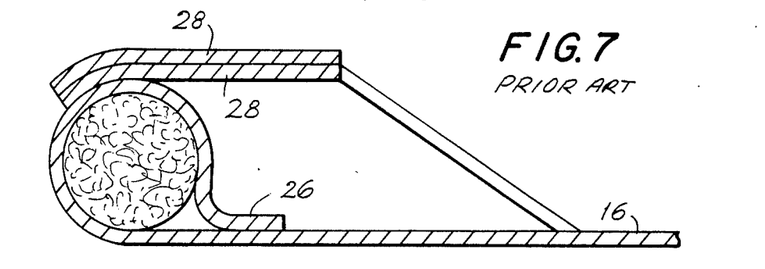
FIG. 7 is a cross-section of on the line 7—7 of FIG. 6 showing the configuration of the egg roll leaf immediately subsequented to final folding and prior to rolling.
Figure 8:
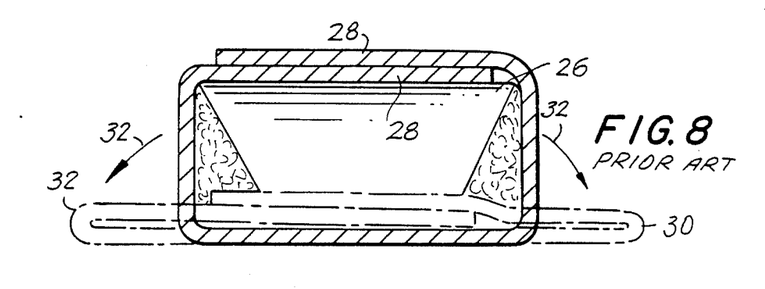
FIG. 8 is a cross-section of on the line 8—8 FIG. 6 illustrating the configuration of the finally folded egg roll leaf, and also illustrating in dotted lines the manner in which the egg roll leaf is displaced during subsequent rolling of the egg roll.

Referring now to FIG. 7, at the time the lateral corners 28 of the leaf 16 are folded inwardly over the top of the folded top corner 26, the lateral corners overlap each other producing an unwanted double thickness of the folded leaf at the location, and, as will be more clearly apparent from FIG. 8, they provide a box-like section in the form of a hollow rectangular cylinder. At this point, in the event that the egg roll is being manually assembled, it is necessary for the operator to tuck in the vertical side walls of the hollow rectangular cylinder, and, this, in fact is one of the manipulations that must be performed by an assembler when employing a prior art leaf 16. If, on the other hand, the egg roll is being assembled by automation, immediately support for the side walls of the hollow rectangular cylinder is removed, that hollow rectangular cylinder will collapse into substantially planar form, as indicated by the dotted lines 30 in FIG. 8.

This collapsing of the verticle side walls of the hollow rectangular cylinder will occur substantially half way up the vertical side walls and in an outward direction as indicated by the arrows 32 in FIG. 8, the geometry being such that outward collapsing of the vertical side walls will occur as opposed to the inward collapsing thereof, such as is manually induced by the assembler in the manual assembling of an egg roll. While mechanical devices could be provided for simulating this movement of an manual assembler, such devices in addition to complicating the apparatus also will introduce stresses in the egg roll leaf at the time the egg roll leaf is already under maximum stress, with a greatly increased risk of tearing or rupturing of the egg roll leaf 16.

Figure 9:
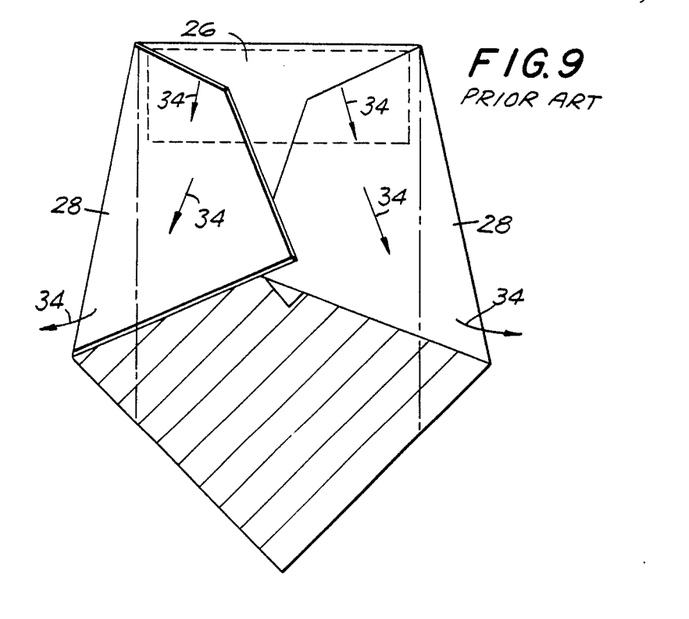
FIG. 9 is an illustration of the prior art egg roll leaf subsequent to the final folds having been made, and illustrates the actual condition that is obtained upon initiation of rolling of the egg roll.

The actual condition that exhibits itself, and which is far removed from the optimum condition of FIG. 6, is the condition illustrated in FIG. 9 in which the folded leaf 16 progressively increases in width in the transverse direction as the folds diverge away from each other in a direction away from the mass of filler material 24. Not only will this result in the some what trapesoidal form of the folded leaf 16, but also, it will induce stresses in the lateral corners 28 acting to pull them downwardly away from the folded top corner 26, as indicated by the arrows 34.

Figure 10:
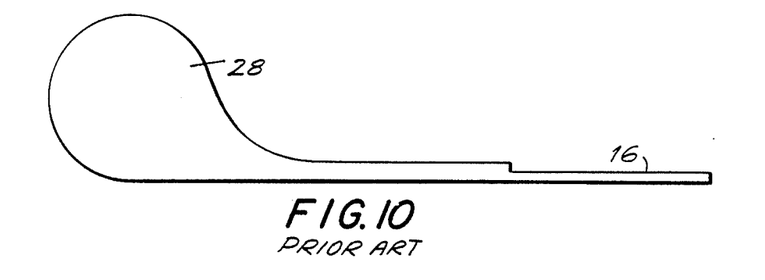
FIG. 10 is a side elevation of the prior art egg roll leaf immediately prior to rolling of the egg roll.
Figure 11:
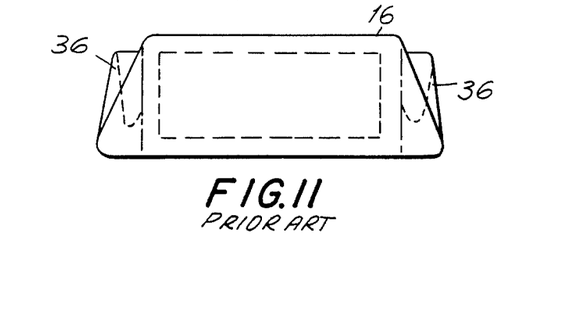
FIG. 11 is a front view of the finally rolled egg roll produced according to the prior art teachings.

If now the partially assembled egg roll of FIG. 9 is rolled, as illustrated in FIG. 10, then, the axial length of the egg roll will progressively increase as the rolling proceeds, this resulting in scroll-like overhangs at the ends of the egg roll as indicated at 36 in FIG. 11. Clearly, such scroll-like overhangs are highly undesirable, not only esthetically, but also in that they increase the bulk of the egg roll at the ends thereof and very substantially reduce its delicacy. The result is that of a substantially solid mass of the pastry material at each of the opposite axial ends of the cylindrical mass of filler material 24. In addition, the delicacy of the egg roll is encumbered by the multiple overlaying of the inwardly folded top end lateral corners.

Another problem occuring with the prior art leaves 16, and which further exaggerates the problem illustrated in FIG. 9, is that the grain of the leaf has been oriented at 45 degrees, and the flexibility of the leaf in the direction of the grain is less than that in directions transverse to the grain. Thus, in the prior art leaf 16 the grain is oriented in a direction such that it will increase the tendency of the lateral corners 28 to splay outwardly in the direction of the arrows 34, i.e., there will be a decided tendency for the lateral corners 28 to splay outwardly rather than to collapse inwardly, the orientation of the grain acting in a direction to inhibit such inward collapsing.

For the reasons discussed above, it has been found either impractical or less desirable to automatically form and roll egg rolls than to have them manually assembled.

The present invention addresses these problems in a satisfactory manner, and, eliminates these problems to an extent that automated rolling of egg rolls can be accomplished closely simulating the form, quality, and delicacy of expertly hand rolled egg rolls.

Referring now to FIGS. 12 through 16, the assembly of an egg roll employing the leaf 12 according to the present invention is discussed.

Figure 12:
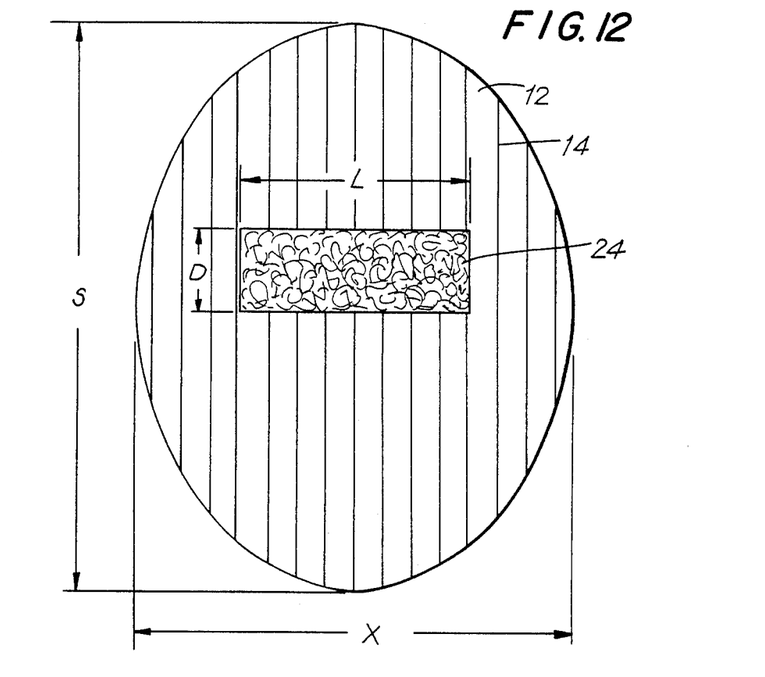
FIG. 12 is an illustration of an egg roll leaf according to the present invention showing a cylindrical mass of filing material disposed thereon.

Referring firstly to FIG. 12, the leaf 12 is placed on a planar surface, and a cylindrical mass of filler material 24 is placed thereon with the axis of the cylindrical mass extended transverse to the grain of the leaf 12. Preferably, but not essentially, the periphery of the cylindrical mass is aligned axillary with the transverse axis of the elliptical leaf 12.

Figure 13:
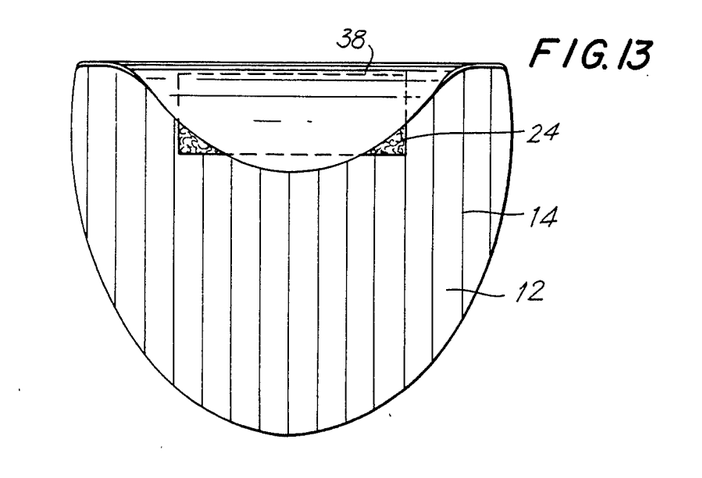
FIG. 13 is an illustration of the egg roll leaf of the present invention after the first fold has been made.

Referring now to FIG. 13, as its conventional, a top portion 38 of the leaf 12 is folded upwardly and over the cylindrical mass of filler material 24. It is here to be observed that this folding operation is effected transversely of the grain 14. However, it is that at this point that the folding is under minimal stress, and, the danger of rupturing or tearing the leaf 12 is in no way increased, but in fact is decreased in that the top portion 38 is at no time required to encounter a sharp bend, but instead only a gentle rolling action.

Figure 14:
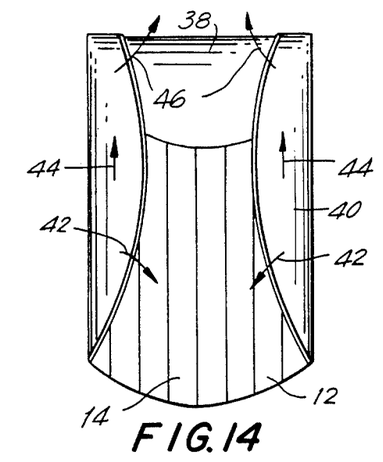
FIG. 14 is an illustration of the egg roll leaf of the present invention after the final folds have been made.

Referring now to FIG. 14, the side portions of 40 of the leaf 12 are folded upwardly and over the top portion 38. However, due to the geometry of the leaf 12, the side portions 40 do not overlap each other as is the case with the prior art leaf 16. Instead, the free edges of the infolded side portions remain spaced from each other, and thus are incapable of mutually supporting each other. Further, it will be noted that the folds produced in the infolding of the side portions extend in line with the grain 14 of the leaf 12, i.e., they extend in the direction of greatest flexibility of the leaf 12.

If the operation of infolding the side portions 40 has been produced by automated machinery, then, prior to the removable of support of the infolded side portions by that machinery, the side portions 40 will collapse downwardly and inwardly into overlying relations with the top surface of the leaf 12, without in any way causing the inwardly folded side portions collapse outwardly in the manner illustrated in FIG. 9 with respect to the prior art.

Instead, there is a proclivity for the infolded side portions to move slightly inwardly in the directions of the arrows 42. In so doing, a force is produced acting in a direction towards the folded top portion 38 as indicated by the arrows 44, this resulting in an upward and inward turning of the side portions 40 at the top portion 38 as indicated by the arrows 46, as opposed to the downward and outward displaying of those corners as indicated by the arrows 34 in FIG. 9.

Figure 15:
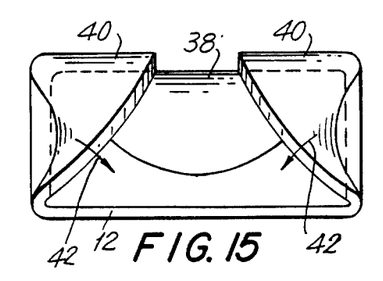
FIG. 15 is a front view of the partially completed egg roll of FIG. 14 prior to rolling; and, FIG. 16 is a front view of a formed egg roll produced by utilizing the egg roll leaf of the present invention.

The net result of these forces is to produce a folded wrapping, in which the longitudinal edges of the wrapping either are parallel to each other or tow slightly inwardly towards each other as illustrated in FIG. 15. This is the optimum condition as illustrated in FIG. 6, and, is the one aimed for by professional assemblers of egg rolls.

Figure 16:
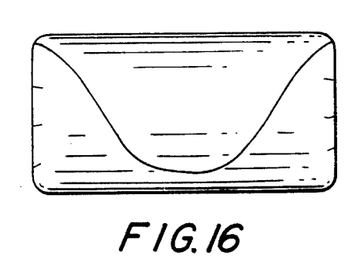

Now that the folding has been effected in a manner closely simulating the manual folding of a wrapping leaf by a skilled assembler, the rolling of the egg roll can proceed by the use of automated machinery to produce an egg roll having the form illustrated in FIG. 16, i.e., one which is substantially devoid of scroll-like overhangs, thus greatly increasing the delicacy of the finished product and its esthetic appearance.

Further, as stresses encountered during the folding of the leaf having being minimized, the leaf itself can be formed more delicately in a lighter gauge than possible according to the prior art. This again enhances the delicacy of the finished product, and at the same time enables a gauge of leaf to be employed in automated assembly of the egg roll closely approximately that of the gauge of leaf employed by a highly skilled manual assembler.

Of essence to the present invention is that the infolded side portions 40 shall not overlap one another. Thus, this can be expressed in the equation:

the length of the transverse axis of the leaf 12 shall be no greater than twice the length of the cylindrical mass of filler material plus twice the diameter of the cylindrical mass of filler material.

As will be appreciated, the length of the transverse axis of the leaf 12 can in fact be less than twice the length of the cylindrical mass of filler material plus twice the diameter. However, for practical reasons, it should not be less than $1\frac{1}{2}$ times the length of the cylindrical mass of filler material plus 2 times the diameter of the cylindrical mass of filler material.

While reference has been made throughout the preceding description to the formation of egg rolls, it will be appreciated that the present invention has equal applicability in the formation of other comestible articles that are wrapped a pastry casing, for example, cocktail sausages, pie fillings which have been extruded into a cylindrical form, fillings of ground meat or fish that have been extruded into a cylindrical form, and in the formation of burritos and the like. In short, the leaf of the present invention has applicability to the wrapping of any desired filling that can be assembled into a reasonably stable cylindrical form.

It further will be appreciated that various modifications can be made in the preferred leaf of the invention as discussed above without departing from the scope of the present invention as defined in the appended claims.

I claim:

1. A wrapping leaf, specifically for use in the automated production of egg rolls closely simulated hand rolled egg rolls in neatness, appearance and delectability;

said wrapping leaf being formed from a rolled edible pastry material, and having a weight in the range of 14–18 leaves to the pound weight;

said wrapping leaf being elliptical in plan form, and, after relaxation of the rolled pastry material, having a major longitudinal axis extending parallel to the grain of the rolled pastry material and constituting the direction of rolling of an egg roll, and having a minor axis constituting the direction of inward folding of the sides of said egg roll;

said minor axis having a length of (1.5L+2D) and not greater than (2L+2D) where L is the axial length of a stable cylindrical form of an edible product to be wrapped in said leaf and D is the diameter of said stable cylindrical form;

whereby, when said edible product is placed on said leaf with the longitudinal axis of said edible product extending substantially parallel to said minor axis of said leaf, the lateral sides of said leaf are capable of extending over the ends of said product and then towards each other, the lateral edges of said leaf remaining spaced one from the other in the absence of any overlapping of the lateral edges of said leaf, thus permitting the said lateral edges to collapse downwardly as the edible product and leaf is rolled to encapsulate said edible product.

2. The wrapping of claim 1, in which said leaf is elliptical in planform.

3. The wrapping leaf of claim 1, in which said leaf is in the form of an irregular polyhedron in planform approximating the planform of an ellipse.

4. The wrapping leaf of claim 1, in which the longitudinal grain of said pastry like material is oriented in the direction of the major axis of said leaf.

5. The wrapping leaf of claim 1, in which said leaf has a weight in the range of 16 leaves per pound weight and dimensions of substantially 8 inches in the direction of its major axis and substantially 6.5 inches in the direction of its minor axis.

6. The leaf of claim 1, in which said leaf is formed from a sheet of pastry material that has been calendered to grain orient that sheet of pastry material in a longitudinal direction, and, the major axis of said leaf extends substantially parallel to the direction of said grain orientation of said pastry material.

* * * * *